(12) United States Patent
Yap et al.

(10) Patent No.: US 9,194,751 B1
(45) Date of Patent: Nov. 24, 2015

(54) SYSTEMS AND METHODS FOR DUAL-MODE OPTICAL SENSING

(71) Applicant: The Boeing Company, Chicago, IL (US)

(72) Inventors: Daniel Yap, Newbury Park, CA (US); Oleg M. Efimov, Thousand Oaks, CA (US)

(73) Assignee: The Boeing Company, Chicago, IL (US)

( * ) Notice: Subject to any disclaimer, the term of this patent is extended or adjusted under 35 U.S.C. 154(b) by 191 days.

(21) Appl. No.: 14/030,670

(22) Filed: Sep. 18, 2013

(51) Int. Cl.
| | | |
|---|---|---|
| *G01J 1/00* | (2006.01) |
| *G01J 5/08* | (2006.01) |
| *F41G 7/22* | (2006.01) |
| *G02B 13/14* | (2006.01) |
| *G01J 3/36* | (2006.01) |
| *F41G 7/00* | (2006.01) |

(52) U.S. Cl.
CPC ............... *G01J 5/0878* (2013.01); *F41G 7/00* (2013.01); *F41G 7/226* (2013.01); *F41G 7/2293* (2013.01); *G01J 3/36* (2013.01); *G02B 13/146* (2013.01)

(58) Field of Classification Search
CPC ..... F41G 7/226; F41G 7/008; G02B 17/0896; G02B 13/146; G01J 3/36; G01J 3/0289
See application file for complete search history.

(56) References Cited

U.S. PATENT DOCUMENTS

| | | | |
|---|---|---|---|
| 6,882,409 B1 * | 4/2005 | Evans et al. .................. 356/4.01 |
| 7,575,191 B2 | 8/2009 | Layton |
| 7,842,908 B2 | 11/2010 | Andresson |
| 7,858,939 B2 | 12/2010 | Tener et al. |
| 8,274,027 B2 | 9/2012 | Andresson et al. |
| 2010/0127174 A1 * | 5/2010 | Tener et al. ............. 250/339.02 |
| 2011/0073704 A1 | 3/2011 | Jenkins et al. |
| 2012/0074295 A1 * | 3/2012 | Andressen et al. ........ 250/203.2 |

FOREIGN PATENT DOCUMENTS

WO   WO 2014175933 A2 * 10/2014

* cited by examiner

*Primary Examiner* — David J Makiya
*Assistant Examiner* — Kenneth J Malkowski
(74) *Attorney, Agent, or Firm* — Joseph M. Butscher; The Small Patent Law Group, LLC (57) ABSTRACT

Systems and methods for dual-mode optical sensing are provided. One system includes a focal-plane array (FPA) imaging detector configured to detect light of a first wavelength range and an illuminated-spot locating detector (ISLD) including an array of light-detecting elements configured to detect light of a second wavelength range, wherein the ISLD has a transparency to light of the first wavelength range. The system further includes a wavelength-selective optical diffuser configured to diffuse light of the second wavelength range, wherein the shortest wavelength of the first range is larger than the longest wavelength of the second range, the ISLD is positioned such that the light to be detected by the FPA imaging detector first passes through the ISLD, and the FPA imaging detector, the ISLD and the wavelength-selective diffuser share a common optical axis.

18 Claims, 5 Drawing Sheets

SYSTEMS AND METHODS FOR DUAL-MODE OPTICAL SENSING

BACKGROUND

The present disclosure relates generally to dual-mode optical sensors, and more particularly, to dual-mode optical seekers, such as used for guiding a steerable rocket or other projectile.

The dual-mode seekers are typically located at the nose or tip of the projectile, such as in a laser-guided projectile. Conventional laser-guided projectiles typically have a silicon quadrant detector forming an illuminated-spot locating detector (ISLD). This quadrant detector has four light-detecting elements, generally of equal size, that have silicon light-absorbing regions. Because silicon is an indirect-bandgap semiconductor, the absorbing regions are very thick (generally more than 50 times larger than the wavelength of the light to be absorbed) in order to provide sufficient sensitivity. Silicon has reasonable absorption for wavelengths between 0.4 and 1.1 µm, but has negligible absorption for light of the eye-safe 1.4-1.65 µm wavelengths. Also, silicon has a fairly high absorption for the long-wave infrared (LWIR) wavelengths. Thus, a silicon quadrant detector is also not suitable for use as the ISLD for detecting laser light of eye-safe wavelengths or that is part of a dual-mode sensor having an in-line optical configuration of the ISLD and a LWIR imaging focal-plane array (FPA) detector. Thus, these known multi-mode optical seekers only detect light having a wavelength shorter than 1.1 µm. Moreover, using an optical diffuser in these seekers would degrade the image formed and result in less than satisfactory performance.

Other dual-mode seekers are known and configured as a combination of a semi-active laser (SAL) seeker and an imaging infrared (IIR) FPA detector. These seekers have an optical system with a wavelength-selective minor that separates the light for the SAL detector from the light for the IIR detector such that the light for the IIR detector does not pass through the SAL detector. Also, only the separated light that is directed to the SAL seeker passes through the optical diffuser or spreader. The spreader is positioned between the optical imaging elements and the SAL detector and is configured to spatially homogenize the laser energy and/or to increase the size of the spot of focused laser energy at the SAL detector. The spreader is, thus, placed between the secondary mirror/lens and SAL detector away from the common aperture and outside the common optical path and IR optical path to the IR detector.

Other prior art multi-mode optical seekers use the same FPA for detecting the SAL radiation of one wavelength and for imaging at another wavelength. One portion of the FPA of detector elements is used to detect the SAL radiation and another portion is used to detect the radiation to be imaged. These seekers contain a wavelength-selective reflector and a defocusing reflector. However, the wavelength selective reflector allows only the SAL wavelength light to reach the defocusing reflector. Thus, the light to be imaged can be sharply focused onto the detector array and the SAL light can be de-focused to a larger spot. With this seeker, the light-absorbing regions of the detector array must absorb both the SAL wavelengths and the imager wavelengths. However, in these seekers approximately only half of the collected optical energy is detected by the SAL detector elements because the elements occupy only half of the overall area of the detector array.

Thus, known seekers have the SAL detector and/or the specific optical elements associated only with the SAL detector that obstruct the light path from, for example, the entrance dome (of the projectile) to the IIR detector. Accordingly, the overall optical system must have a larger diameter, otherwise the seeker would have lower imager sensitivity, as not all of the effective cross-sectional area at the dome can be used to collect light for the imager or for the SAL detector.

SUMMARY

In one embodiment, an optical sensor is provided that includes a focal-plane array (FPA) imaging detector configured to detect light of a first wavelength range and an illuminated-spot locating detector (ISLD) including an array of light-detecting elements configured to detect light of a second wavelength range, wherein the ISLD has a transparency to light of the first wavelength range. The optical sensor further includes a wavelength-selective optical diffuser configured to diffuse light of the second wavelength range, wherein the shortest wavelength of the first range is larger than the longest wavelength of the second range, the ISLD is positioned such that the light to be detected by the FPA imaging detector first passes through the ISLD, and the FPA imaging detector, the ISLD and the wavelength-selective diffuser share a common optical axis.

In another embodiment, a method for providing an optical sensor is provided. The method includes positioning along an optical axis a focal-plane array (FPA) imaging detector configured to detect light of a first wavelength range. The method further includes positioning inline along the optical axis an illuminated-spot locating detector (ISLD) including an array of light-detecting elements configured to detect light of a second wavelength range, wherein the ISLD has a transparency to light of the first wavelength range. The method also includes positioning inline along the optical axis a wavelength-selective optical diffuser configured to diffuse light of the second wavelength range, wherein the shortest wavelength of the first range is larger than the longest wavelength of the second range, the ISLD is positioned such that the light to be detected by the FPA imaging detector first passes through the ISLD, and the FPA imaging detector, the ISLD and the wavelength-selective diffuser share a common optical axis.

The features and functions that have been discussed can be achieved independently in various embodiments or may be combined in yet other embodiments, further details of which can be seen with reference to the following description and drawings.

DETAILED DESCRIPTION

The following detailed description of certain embodiments will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or random access memory, hard disk, or the like) or multiple pieces of hardware. Similarly, the programs may be stand-alone programs, may be incorporated as subroutines in an operating system, may be functions in an installed software package, and the like. It should be understood that the various embodiments are not limited to the arrangements and instrumentality shown in the drawings.

As used herein, the terms "system," "unit," or "module" may include a hardware and/or software system that operates to perform one or more functions. For example, a module, unit, or system may include a computer processor, controller, or other logic-based device that performs operations based on instructions stored on a tangible and non-transitory computer readable storage medium, such as a computer memory. Alternatively, a module, unit, or system may include a hard-wired device that performs operations based on hard-wired logic of the device. The modules or units shown in the attached figures may represent the hardware that operates based on software or hardwired instructions, the software that directs hardware to perforin the operations, or a combination thereof.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Also as used herein, the phrase "image" or similar terminology is not intended to exclude embodiments in which data representing an image is generated, but a viewable image is not. Therefore, as used herein the term "image" broadly refers to both viewable images and data representing a viewable image. However, certain embodiments generate, or are configured to generate, at least one viewable image.

Various embodiments provide systems and methods for dual-mode optical detection, such as for a dual-mode optical sensor (or dual-mode optical seeker) with a wavelength-selective optical diffuser. For example, the wavelength-selective optical diffuser of various embodiments enables the dual-mode optical sensor to have an in-line configuration and, as a result, to have a smaller diameter, to collect more light for a given aperture diameter, and/or to have a larger angular field of view. Additionally, in various embodiments, the dual-mode optical sensor includes an illuminated-spot locating detector (ISLD) that contains absorber regions comprising a direct bandgap material, such as InGaAs or HgCdTe.

Additionally, interface circuits and an illuminated-spot centroid determination (ISCD) circuit of various embodiments of the dual-mode optical sensor described herein can determine and provide to a subsequent projectile-guidance processor at a rate exceeding 1 MHz, and in some cases 100 MHz or greater, wherein the values are indicative of the angle-of-arrival of the SAL light. In operation, the high output rates enable the guidance processor to determine the time-code of the detected SAL signal and to discriminate between the short pulses representative of the SAL light reflected from a target and the other temporal waveforms that may be produced by SAL light associated with clutter reflections. Thus, various embodiments provide a linear response when the incident angle of the SAL light is large and the readout circuits of various embodiments are able to distinguish between narrow pulses and wider pulses.

Additionally, as described in more detail herein, the interface circuits and the ISCD circuit of various embodiments of the dual-mode optical sensor are located beyond the periphery of the ISLD (and not underneath the ISLD). By placing the electronic circuit components, and also the solder bumps and metal bonding pads used for the electrical interconnections, at or beyond the periphery of the ISLD, the dual-mode optical sensor can increase or maximize the transmission of the longer-wavelength light to be detected by the imaging detector.

Additionally, the ISLD may be mounted on a base having a central portion over which the light-detecting area of the ISLD lies. As a result, the light to be detected by the imager passes only through the light-detecting area of the ISLD. Thus, the LWIR light for the imager is not absorbed and the silicon readout circuits that are not located underneath an array of the SAL-light detectors do not prevent the LWIR light from reaching the imager.

Figure 1:
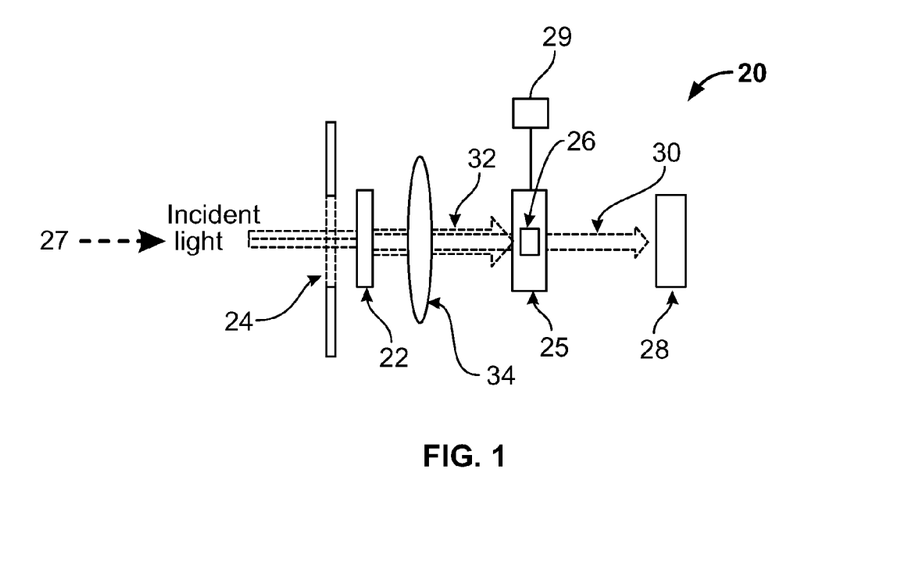
FIG. 1 is a schematic illustration of a dual-mode optical sensor in accordance with various embodiments.

More particularly, one embodiment of a dual-mode optical sensor 20 (also referred to as a dual-mode optical seeker) is illustrated in FIG. 1. The dual-mode optical sensor 20 includes a wavelength-selective optical diffuser 22 that operates without or with reduced blurring of the optical image formed on the detector. In the illustrated embodiment, the wavelength-selective diffuser 22 is positioned at or adjacent at an optical aperture 24, for example, across an optical light path 27 (illustrated as incident light entering the optical aperture 24). For example, the wavelength-selective diffuser 22 is positioned a distance from the optical aperture 24 such that light entering through the optical aperture 24 (from left to right as viewed in FIG. 1) first passes through the wavelength-selective diffuser 22 before reaching the other components of the dual-mode optical sensor 20. The wavelength-selective diffuser 22 is, thus, positioned in front of the other components of the dual-mode optical sensor 20 along a direction of travel of incident light. However, it should be noted that the positioning of the wavelength-selective diffuser 22 may be varied, such as positioned along the optical light path 27, for example between different components of the dual-mode optical sensor 20.

In the illustrated embodiment, the dual-mode optical sensor 20 generally includes a laser light detecting element (capable of detecting light at one or more wavelengths, such as laser wavelengths), illustrated as semi-active laser (SAL) detector 25, which may include an illuminated-spot locating detector (ISLD) 26 and associated electronics as described herein. The ISLD 26 is positioned a distance along the optical light path 27 in-line with the wavelength-selective diffuser 22, for example, such that a common optical path is defined or shared between the components. The dual-mode optical sensor 20 also includes an imaging detector (capable of detecting light at a different wavelength or wavelengths than light detected by the ISLD 26), illustrated as a focal plane array (FPA) imaging detector 28, which may include associated electronics as described herein.

Thus, in the illustrated embodiment, the dual-mode optical sensor 20 has an in-line optical configuration defining a common optical axis. In operation, the optical aperture 24 (which may be sized and shaped based on, for example, the application or use of the dual-mode optical sensor 20) is configured to collect light of a first wavelength range (e.g., long-wave infrared (LWIR) range of 8-12 μm), as well as laser light at multiple wavelengths in a second wavelength range (e.g., 1.0 μm-1.65 μm). In some embodiments, the shortest wavelength of the first range is at least 5 times larger than the longest wavelength of the second range. However, as should be appreciated, detection at different wavelengths and relative ranges may be provided.

In various embodiments, the FPA imaging detector 28 is capable of detecting light 30 of a first wavelength range (e.g., LWIR light) and the ISLD 26 includes multiple elements that are capable of detecting light 32 of the entire second wavelength range (e.g. laser light). In the illustrated embodiment, the ISLD 26 is configured to have a high transparency to light of the first wavelength range, for example, such that all or substantially all of the light 30 passes through the ISLD 26 to the FPA imaging detector 28 (e.g., 20% or less absorption), while all or substantially all of the light 32 is absorbed and detected by the ISLD 26 (e.g., greater than 90%).

Additionally, the wavelength-selective optical diffuser 22 is configured to diffuse or spread the light 32 (e.g., laser light of the second wavelength range), but minimally diffuse or spread the light 30 of the first wavelength range (e.g., less than 10% from a projected path). It should be noted that the dual-mode optical sensor 20 also includes an optical imaging system 34, such as a lens or compound lens, that projects and focuses the light 30 (of the first wavelength range) onto the FPA imaging detector 28 and that, in combination with the wavelength-selective optical diffuser 22, projects onto the ISLD 26 an illuminated spot that simultaneously or concurrently overlaps a plurality of light-detecting elements of the ISLD 26 (e.g., more than four light-detecting elements of the ISLD 26), which comprises an array of light-detecting elements (e.g., at least 20 light-detecting elements).

It should be noted that the FPA imaging detector 28 is generally coupled to one or more associated readout integrated circuits, with both being part of or forming an imaging infrared (IIR) sensor in some embodiments. The ISLD 26 also has the multiple detector elements coupled to associated electronic interface circuits (not shown). The interface circuits are then coupled to an illuminated-spot centroid determination (ISCD) circuit 29 as described in more detail herein. It further should be noted that although the optical imaging system 34 is illustrated as comprising a single lens, the optical imaging system 34 may comprise multiple refractive, reflective and/or diffractive elements.

The wavelength-selective diffuser 22, thus, homogenizes the intensity of the light in the illuminated spot at the ISLD 26, to enable the ISLD 26 to make a determination of the incidence angle of the light 32, which in the illustrated embodiment is laser light. However the wavelength-selective diffuser 22 in various embodiments is also configured to have reduced or minimal effect on the longer wavelength light so that the image projected onto the FPA imaging detector 28 is well focused and not blurred. It should be noted that atmospheric effects such as turbulence and any damage to or obstructions upon an entrance dome that is in front of the aperture 24 can produce a non-uniform illumination pattern on the optical aperture. This non-uniform pattern at the aperture 24 results in a non-uniformly illuminated spot being projected on the ISLD 26, which results in an erroneous estimate of the incidence angle of the laser light. The wavelength-selective diffuser 22 homogenizes the light paths and in various embodiments produces a smooth intensity pattern for the illuminated spot.

It further should be noted that the wavelength-selective diffuser 22 may be positioned at different locations along the optical path 26, such as between the aperture 24 and the optical imaging system 34, within the optical imaging system 34, or between the optical imaging system 34 and the ISLD 26.

In various embodiments, the dual-mode seeker 20 includes the ISLD 26, which is configured as a sensor for light from a semi-active laser (SAL) designator, and the FPA imaging detector 28, which is configured as a sensor for infrared light emitted and/or reflected by a scene. In some embodiments, the FPA imaging detector 28, when configured as a sensor for the light emitted and/or reflected by the scene, is an IIR sensor with an output thereof used to provide an infrared image of the scene. The ISLD 26 configured as a SAL sensor may be used to determine the angle of incidence of the SAL light (relative to the position of the dual-mode optical sensor 20) that is reflected from one or more objects in the scene (e.g., viewed through the aperture 24). It should be noted that the light to be detected by either sensor (ISLD 26 or FPA imaging detector 28) is collected through the optical aperture 24.

Thus, in various embodiments, the dual-mode optical sensor 20 has a compact and small diameter design since both of the sensors (ISLD 26 or FPA imaging detector 28) share the same aperture 24 and the same optical focusing system (e.g., optical imaging system 34 that may include one or more refractive or diffractive elements such as lenses, but does not need any reflective elements). By configuring the dual-mode optical sensor 20 to allow, for example, the LWIR light for the IIR sensor to pass through the SAL sensor, which has high optical transparency to those LWIR wavelengths, the in-line optical configuration is provided, with the components of the dual-mode optical sensor 20 having a common optical axis.

Figure 2:
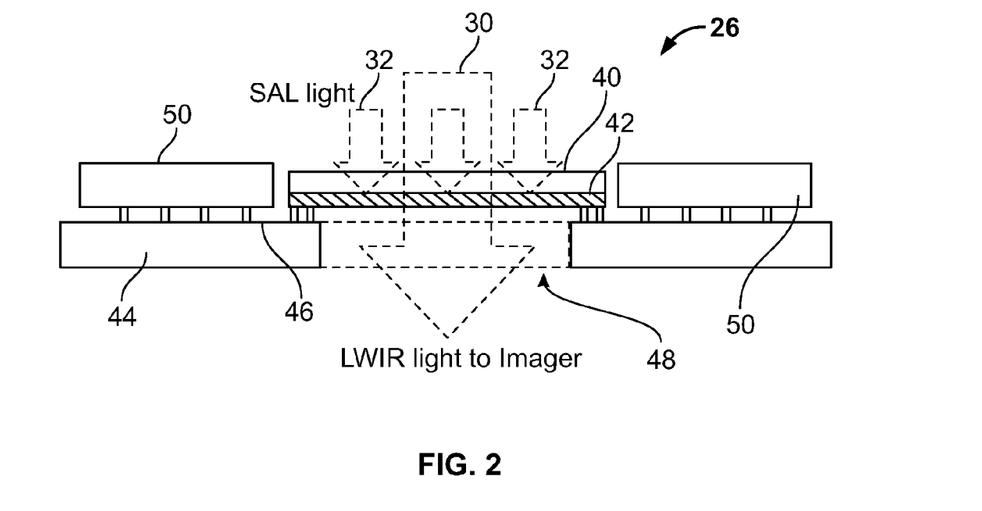
FIG. 2 is a schematic illustration of an illuminated-spot locating detector (ISLD) in accordance with an embodiment.

FIG. 2 illustrates the ISLD 26 formed in accordance with various embodiments, wherein the ISLD 26 includes an ISLD substrate 40 coupled with an ISLD absorber 42, illustrated in a dual layer configuration. The ISLD 26, which is configured as a SAL seeker in this embodiment, includes multiple detector elements (formed as part of the ISLD substrate 40 coupled with an ISLD absorber 42) that are capable of detecting light of wavelengths emitted by the laser designators (e.g., the light 32), with the ISLD 26 having high transparency to longer wavelength light, such as the LWIR light (e.g., the light 30) to be detected by the FPA imaging detector 28 (shown in FIG. 1) of the IIR sensor. The ISLD 26 also includes an interconnect base 44 (e.g., a base substrate or support structure) that can contain electrical interconnect paths 46 (e.g., electrical traces on a substrate). The base 44 in this embodiment includes an opening 48 formed therein that is aligned at least in part with the ISLD substrate 40 coupled with the ISLD absorber 42. For example, in the illustrated embodiment, the opening 48 is formed through the entire base 44 at a central portion or region of the interconnect base 44. As can be seen, the ISLD 26 (formed from the ISLD substrate 40 and the ISLD absorber 42) is mounted upon the interconnect base 44 in proximity to the opening 48, such as aligned with the central portion of that interconnect base 44 in this embodiment.

It should be noted that electronic circuits 50 may be mounted to the interconnect base 44. For example, the electronic circuits may include electronic interface circuits and the ISCD 29 as described in more detail herein. The interface circuits and the ISCD 29 are mounted upon the interconnect base 44 a distance from the opening 48, which is away from the central portion of the base 44 in this embodiment, such as not to block the LWIR light passing through the opening 48. For example, the light 30 to be detected by the FPA imaging detector 28 is projected by the optical imaging system 43 (shown in FIG. 1) to pass through the ISLD 26, through the opening 48 (in the central portion of the interconnect base 44), and onto the FPA imaging detector 28. It should be noted that the components coupled to the base 44 may be mounted thereto using an suitable means, such as by soldering, with bump bonds, or with other suitable electrical interconnects. For example, chip-to-chip or chip-to-base coupling can be used to electrically couple the ISLD 26 to the interconnect base 44. Additional solder bumps, etc. may be used to couple the interconnect base 44 to the interface circuits 50 and the ISCD circuit 29.

Thus, in the illustrated embodiment, the dual-mode optical sensor 20 has the wavelength-selective optical diffuser 22 that diffuses or spreads the laser light, but that minimally diffuses or spreads the LWIR light. Additionally, the optical imaging system 34, such as a lens or compound lens, projects and focuses the LWIR light onto the FPA imaging detector 28 and that, in combination with the wavelength-selective optical diffuser 22, projects onto the ISLD 26 an illuminated spot that simultaneously or concurrently overlaps with a plurality of light-detecting elements of the ISLD 26. For example, the ISLD 26 may comprise multiple light-detecting elements that are formed on a common substrate, such as the ISLD substrate 40. Each light detecting element contains an absorber region, which may be formed with the ISLD absorber 42 and that comprises, in some embodiments, a direct-bandgap semiconductor material that absorbs the SAL light (of the second wavelength range), but that has reduced or minimal absorption of the LWIR light (of the first wavelength range). Thus, the ISLD substrate 40 is configured or formed to have reduced or minimal absorption for light of the first wavelength range and also reduced or minimal absorption for light of the second wavelength range. For example, is some embodiments, the ISLD absorber 42 can comprise a material such as InGaAs or HgCdTe, among others, and the ISLD substrate 40 can comprise a material such as InP or GaAs or CdTe, among others. The absorber regions of the ISLD absorber 42 are located adjacent to a first surface or face of the ISLD substrate 40 (illustrated in FIG. 2 as a lower face closer to the interconnect base 44). In some embodiments, the wavelength-selective optical diffuser 22 (shown in FIG. 1) can be formed on a second surface of the ISLD substrate 40 that is opposite the first surface (e.g., on a top surface of the ISLD substrate 40 as viewed in FIG. 2).

It should be noted that the thickness of the absorber regions in various embodiments is generally smaller than ten times the maximum wavelength of the second wavelength range and can be as small as one times, or even as small as one-half times, the maximum wavelength of the second wavelength range in other embodiments. However, different relative thicknesses may be provided. The ISLD 26 can also have various two-dimensional arrangements of multiple elements. For example, the ISLD 26 can comprise an array of N×N elements, with N being as small as 4 and as large as 80 in some embodiments. However, it should be appreciated that different numbers of elements smaller than 4 and greater than 80 may be provided, and the array may have a configuration other than a square, for example, a rectangle, octagon, or other polygon shape, among others. The ISLD 26 may be provided as described herein, such as a detector array. However, different types of ISLDs may be provided, for example, using a quadrant detector (formed from silicon or other materials).

It should be noted that the SAL light is illustrated as first passing through the ISLD substrate 40 before that light is absorbed by the detector elements of the array formed in the ISLD absorber 42. For such a configuration, the ISLD substrate 40 is transparent to the SAL light. However, the SAL light and the LWIR light also may be incident from the side of the ISLD 26 that contains the absorber regions. In this case, the ISLD substrate 40 is also transparent to the LWIR light, but can absorb the SAL light. Other configurations are contemplated, for example, in which the ISLD substrate 40 is removed or the interconnect base 44 is transparent.

The dual-mode optical sensor 20 may be used, for example, for guiding a steerable rocket, missile, bomb or other projectile and is typically located at the nose or tip of that projectile. The in-line configuration of the components in the dual-mode optical sensor 20 enables the dual-mode optical sensor 20 to have a smaller diameter and to make more efficient use of the available area at the nose of the projectile for an aperture that captures both the longer-wavelength light to be imaged and the shorter-wavelength laser light having an incidence angle relative to the position of that projectile that is to be determined. For example, the dual-mode optical sensor 20 may be fit within the pointed-nose shape of many projectiles (having a diameter at the tip of the nose smaller than 1 inch) and within the small-diameter (less than 3 to 4 inch diameter) shape of other projectiles. Thus, the dual-mode optical sensor 20 can be incorporated in a larger variety of projectiles with minimal or no change to the outer shape or outline of the projectile.

Moreover, the dual-mode optical sensor 20 can make use of lower cost optical imagers that are based on un-cooled microbolometers. Such imagers typically are packaged in sealed housings having a front surface that is several millimeters (mm) or more away from the focal plane of the imager. The thick housing prevents the ISLD 26 from being located at the focal plane associated with the corresponding wavelength range. As a result, the spot of laser light, which essentially is the image of the illuminated aperture, projected onto the ISLD 26 by the optical imaging system may be de-focused. Atmospheric effects such as turbulence and any damage to or obstructions upon the aperture can produce a non-uniform illumination pattern on the optical aperture 24 as described herein. This non-uniform pattern at the aperture 24 results in a non-uniformly illuminated spot being projected on the ISLD 26, which can result in an erroneous estimate of the incidence angle of the laser light reflected from a target. The wavelength-selective diffuser 22 homogenizes the intensity of the light in the illuminated spot at the ISLD 26, to enable the SAL sensor to make a correct determination of the incidence angle of the laser light. However, the wavelength-selective diffuser 22 is designed to have minimal effect on the longer wavelength light so that the image projected onto the imager is well focused and not blurred.

The dual-mode optical sensor 20 can also have a large instantaneous field of view (FOV) for both the SAL sensor and the IIR sensor even though both of the sensors are mounted in the projectile in a body-fixed configuration rather than being placed on a gimbal that can move the pointing direction of those sensors. The overall instantaneous FOV of the ISLD 26 (or of the FPA imaging detector 28) is determined by the overall lateral size of the ISLD 26 (or of the FPA imaging detector 28) and the effective F-number of the optical imaging system 34. For a typical ISLD, which commonly is a 4-quadrant detector, the overall size of that 4-quadrant detector typically equals twice the width or lateral size of one of the 4 light-detecting elements. The size (e.g., diameter) of the illuminated-spot pattern typically is equal to or slightly larger than the width of one of the light-detecting elements (which typically is >5 mm for 4-quadrant detectors constructed from silicon), such that the spot simultaneously illuminates all 4 detector elements, but the size of the illuminated-spot pattern is smaller than the total area covered by the 4 adjacent detector elements. In contrast to the 4-quadrant detector, the ISLD 26 of the dual-mode sensor 20 may comprise from, for example, 16 to greater than 10,000 elements and the optical imaging system 34 and that ISLD 26 are configured to project an illuminated spot that simultaneously overlaps more than four adjacent light-detecting elements of the ISLD 26.

The dual-mode sensor 20 can provide accurate determination of the incidence angle of laser light incident upon the aperture 24 despite having a non-uniform illumination pattern produced at the aperture 24. The dual-mode optical sensor 20 also simultaneously can project onto the FPA imaging detector 28 a sharply focused LWIR image of a scene viewed through the aperture 24. This dual capability is achieved in part by the use of the wavelength-selective optical diffuser 22. In particular, the dual-mode optical sensor 20 takes advantage of the fact that the wavelength of the light to be imaged is at least 5 times larger and can be more than 10 times larger than the wavelength of the laser light to be detected by the ISLD 26. This restriction on the wavelengths of the light makes possible the wavelength selectivity of the wavelength-selective optical diffuser 22.

In various embodiments, the dual-mode optical sensor 20 can provide an imaging-seeker guided product with an upgraded capability of semi-active laser (SAL) designated guidance. Also, the dual-mode optical sensor 20 can provide a SAL-seeker guided product with an imaging capability that can be especially beneficial for terminal guidance. The small-diameter and compact size of the in-line dual-mode optical sensor 20 makes the dual-mode optical sensor 20 suitable for many guided munitions. Because the dual-mode optical sensor 20 can make use of the lower-cost micro-bolometer imagers as described herein, the dual-mode optical sensor 20 is suitable for other higher-volume products. Additionally, the dual-mode optical sensor 20 can be used in a body-fixed configuration.

More particularly, the SAL sensor is able to have very fast response, and large response bandwidth, while also having a large instantaneous FOV when used in a strap-down configuration (without any gimbal to change the pointing direction of that sensor). This is achieved by having a large-area ISLD 26 that comprises an array of multiple detector elements. The multi-element arrayed ISLD 26 connects each element of the array to a separate electronic interface circuit that converts the photocurrent generated by each array element of the ISLD 26 into an amplified electrical signal waveform. The interface circuit then makes a binary determination of whether or not laser light was detected by that specific array element at specific sampling times or time intervals. The 1-bit digital outputs from all of the array elements are processed by the ISCD circuit 29 to determine the centroid of the illuminated spot pattern using, for example, known centroid determination algorithms. The resulting output is a sequence of numerical values that indicate the location (in two axes) of the centroid of the illuminated-spot pattern that is projected onto the plane of ISLD 26. This output sequence can have a very high data rate and the effective sampling rate (for synchronously sampled array elements) can exceed 1 MHz and in some embodiments exceed 100 MHz. It should be noted that the sampling times or time intervals also may be determined by other means, such as by the occurrence of time-integrated threshold-exceeding events.

In an exemplary embodiment, the ISLD 26 has an InGaAs absorber 42 on an InP substrate 40 that enables the ISLD 26 to be suitable for detecting laser light of 1.0-1.65 µm wavelength. It should be noted that InGaAs has a direct bandgap and thus an absorption efficiency that is very high. For example, an InGaAs layer having a thickness of approximately 3 µm is sufficient to absorb almost 100% of the laser light that is coupled into that layer. In various embodiments, the ISLD 26 has a PIN photo-diode structure, but other light-detecting device structures such as an avalanche photodiode also may be used. In one embodiment, the InGaAs absorber regions, when not illuminated, would be depleted of free carriers and would comprise the I-layer of the PIN structure. The electrically conductive P-layer and N-layer comprise material such as InP that is lattice matched to the InGaAs material and that is transparent to the laser wavelengths (as well as to the LWIR light). The capacitance per unit area of the PIN structure is fairly large, since the I-layer is fairly thin. An exemplary value is $0.5 \times 10^{-4}$ pF/µm$^2$. Each PIN detector has a fairly small area in order to achieve fast response. The large-area ISLD desired for having large FOV is thus achieved by having an array with many smaller-area PIN detectors. It should be noted that the variously described materials and component values may be changed as desired or needed.

Figure 3:
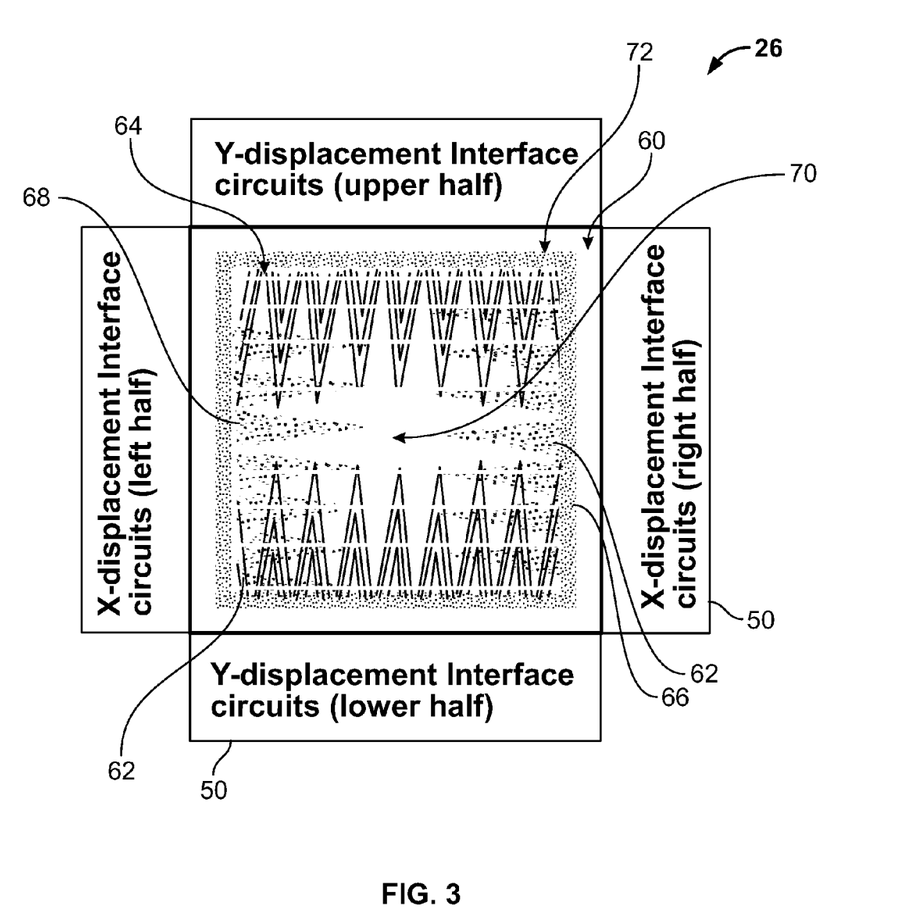
FIG. 3 is an illustration of a detector array of an ISLD in accordance with an embodiment.

FIG. 3 illustrates a two-dimensional array 60 of the detectors 62 (also referred to as detector elements 62), with an exemplary rectangular grid arrangement. However, other geometric arrangements and shapes of the detectors in the array may be provided, such as hexagonal close-packed arrangements or triangular arrangements. In various embodiments, it is desirable to place the detectors 62 close to each other and to reduce or minimize the width of the gaps between adjacent detectors 62. This placement increases or maximizes the amount of light that is collected by the detectors 62. The detector array 60 in various embodiments is located near the center of the ISLD 26 as described herein. In one embodiment, each detector element 62 has at least one electrical contact made between the detector element 62 and one or more bond pads located at the periphery 64 of the array 60. The electrical contact for a given detector element 62 in some embodiments is located in such a manner that increases or maximizes the area through which the laser light can be collected and detected, such as at the periphery of that detector element 62. In one embodiment, the metal interconnect lines between the detector elements 62 and corresponding bond pads are routed in a way that reduces or minimizes the blocking or obstruction of the LWIR light, which must pass through the ISLD 26, having bond pads 66 located at the periphery 64 of the ISLD 26 and outside of the area occupied by the array 60 of detector elements 62. As illustrated in the figure, the density of the interconnect lines 68 (shown in a triangular type of pattern) is also greatest near the edges of the array 60 and the ISLD 26 has greater transparency in a central portion 70. Thus, the center of the FOV of the imager has the best sensitivity.

Moreover, the electronic circuits 50 (illustrated in this embodiment as X and Y displacement interface circuits to determine the location of a detected light spot) associated with the SAL sensor are located beyond the outer edges 72 of the ISLD 26. The electronic circuits 50 can, for example, surround all four sides of the ISLD 26. It should be noted that the SAL sensor is located closer to the optical imaging system 34 (e.g., lens) than the IIR sensor. If the desired FOV of the IIR sensor is equal to or smaller than the desired FOV of the SAL sensor, the light to be detected by the HR sensor would only need to pass through the ISLD portion of the SAL sensor (as such, the electronic circuits 50, which at the least have metal portions that may block and/or absorb the light are positioned at the periphery of the array 60).

The dual-mode optical sensor 20 in various embodiments is configured having selected values of parameters, for example, for the location of the ISLD 26 relative to the optical imaging system 34 or the FPA imaging detector 28, the size of the light-detecting area of the ISLD 26 and the number of detector elements 62 in the ISLD 26. For example, the desired size of the ISLD 26 depends on the desired FOV as well as on the size of the spot of laser light projected onto the ISLD 26. Ideally, the entire spot of laser light should overlap some detector elements 62 even when that spot is moved to the limits of a region of motion, associated with the edge of the FOV. However, it should be appreciated that in some embodiments, a portion of the spot of laser light overlaps some detector elements 62.

Figure 4:
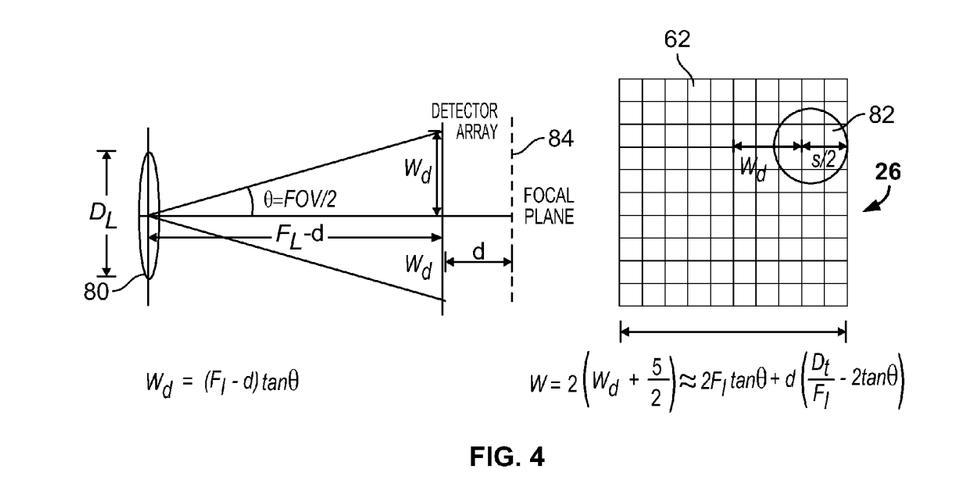
FIG. 4 is an illustration of determining a size of elements for an ISLD in accordance with an embodiment.

FIG. 4 illustrates an ISLD 26 that has a square shape. However, the ISLD 26 may have an outline or contour of other shapes such as a circle, ellipse or rectangle. The minimum overall size W of the ISLD array of elements 62 thus depends on the FOV, the effective diameter and focal length of the optical imaging system 34, illustrated as a lens 80 (or its F-number), and the offset distance of the ISLD 26 from the focal plane 84 associated with the wavelength of the laser light.

Figure 5:
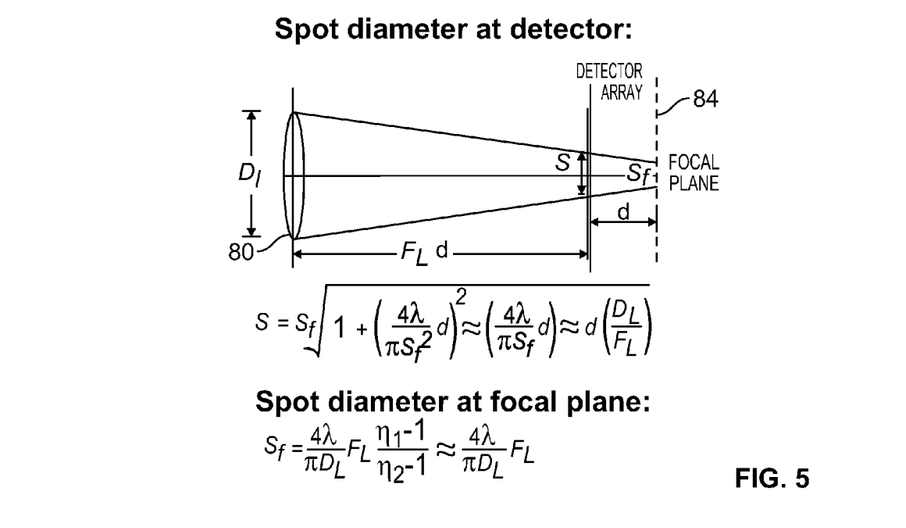
FIG. 5 is an illustration of determining a size of an illuminated spot of laser light in accordance with an embodiment.
Figure 6:
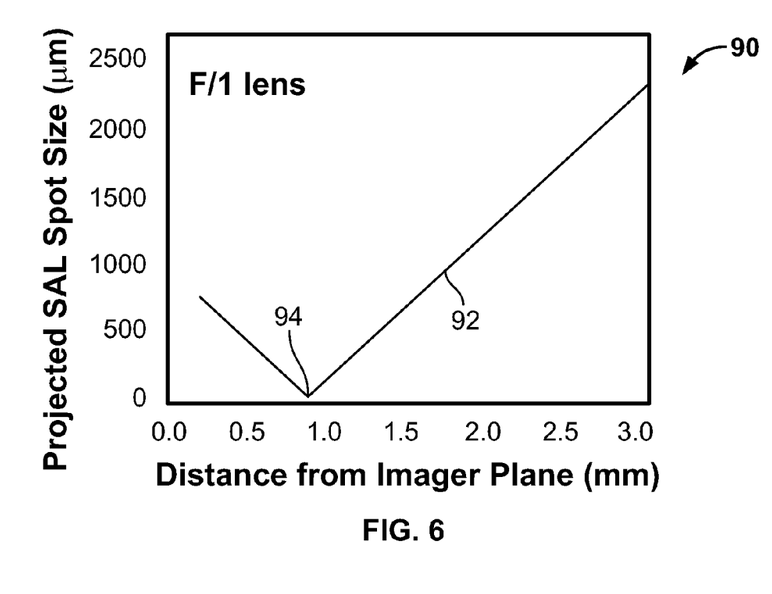
FIG. 6 is a graph illustrating light spot size versus offset distance.

The size of the spot 82 illuminating the detector array of the ISLD likewise is dependent on the effective diameter $D_L$ and focal length $f_L$, of the lens 80 (or on the effective F-number of the lens 80) and on the offset distance d of the ISLD 26 from the focal plane 84 associated with the wavelength $\lambda$ of the laser light, as illustrated in FIG. 5. FIG. 6 illustrates a graph 90 showing an example of the calculated size of the spot projected onto the ISLD 26 and how that spot size is changed as the offset spacing between the ISLD 26 and the focal plane 84 of the IIR detector is changed. In the graph 90, the horizontal axis corresponds to the distance from the imager plane, for example, the focal plane 84, and the vertical axis corresponds to the projected SAL spot size. As can be seen by the curve 92 the projected spot size decreases to a point 94 (illustrated a 1.0 mm from the focal plane 84) and then increases thereafter.

When the dual-mode sensor 20 has an HR sensor with a micro-bolometer FPA, a fast lens such as one with an F-number of F/1 may be used in order to collect more light and to enable the overall size of the FPA imaging detector 28 to be smaller. Such a lens is assumed in the exemplary calculation for the graph 90. Also, the calculation assumes the lens is constructed from GASIR-1 chalcogenide glass material, which has high transparency for wavelengths between 0.8 μm and 14 μm. Because GASIR-1 has significant dispersion over this broad extent of wavelengths, the focal plane for the ISLD 26, which is, for example, set for best focus of 1.06 μm light, is displaced from the focal plane 84 for the FPA imaging detector 28, which is set for optimal focus of 10 μm light. The offset distance between these two focal planes is approximately 0.9 mm, but may be varied as desired or needed. As the ISLD 26 is moved even closer to the lens 80 (and as the value for d becomes larger), the size of the laser-illuminated spot 82 on the ISLD 26 becomes larger. Additionally, the incidence angle of the SAL may be determined as also described therein.

Figure 7:
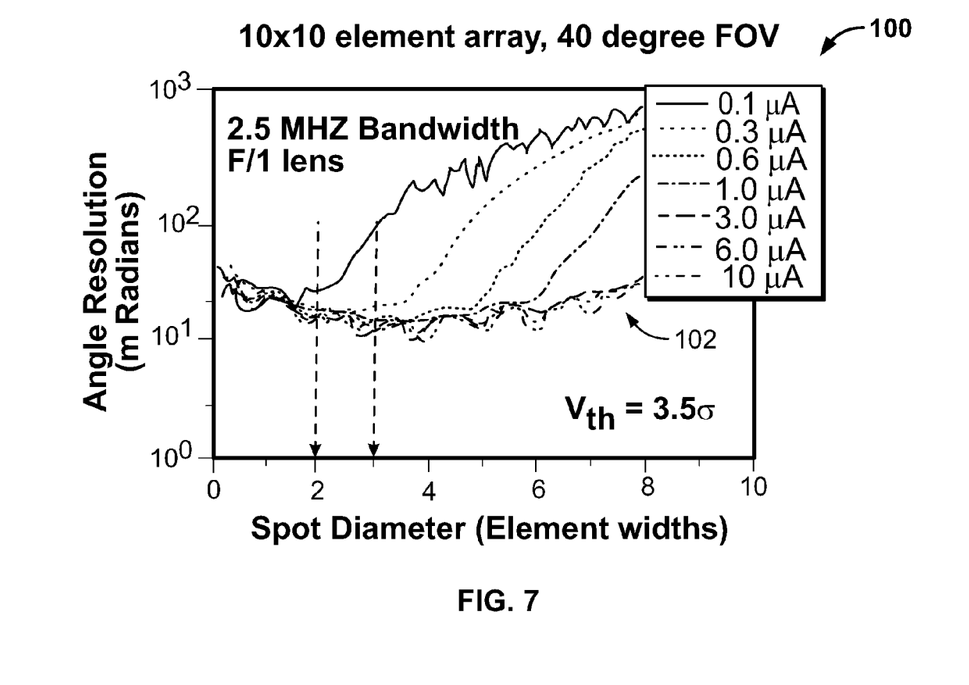
FIG. 7 is a graph illustrating simulated angle-resolution of an illuminated spot locating detector formed in accordance with various embodiments.

FIG. 7 is a graph 100 illustrating the dependence of the resolution with which the incidence angle of the SAL light can be estimated on the offset distance d, and thus the spot diameter, and on the anticipated intensity of the collected laser light. The curves 102 in this simplified example assumes the SAL sensor has a fixed angular field of view of 40 degrees and also assumes that the optical diffuser does not broaden the spot produced at the ISLD 26 (compared to the spot size due solely to the lens 80). The photon-to-electron conversion efficiency of a detector can be described in terms of responsivity, which is given as the ratio of the photo-generated current to the input optical power (with units of Amps per Watt). Thus, assuming some value for the responsivity of a photodetector element of the array (a value between 0.5 and 1.0 A/W is reasonable for many PIN detectors), the total photocurrent output that can be produced by all of the illuminated detector elements, thus, may be estimated. This value of total photocurrent is divided among the illuminated elements according to the relative amount of overlap between the illuminated spot 82 and the light-detecting area of an element 62 (both shown in FIG. 4). Thus, the signal photocurrent output by a given detector element 62 of the array may be estimated.

The noise current effectively produced at the output of the detector element 62 (or at the input to the electronic interface circuit) also may be estimated. The effective input-referred noise current depends on factors such as the capacitance of the detector element 62, which depends on the area of that element 62. The effective input-referred noise current also depends on the response bandwidth, since the noise is integrated over that bandwidth. Furthermore, if it is assumed that the array has a fixed number of elements 62 and that the FOV is fixed, the noise current will vary as the diameter of the spot 82 is varied. It should be noted that for the calculation resulting in the curves 102, a circular and uniformly illuminated spot is assumed. In the graph 100, the vertical axis corresponds to the spot diameter and the vertical axis corresponds to the angle resolution.

The results plotted in the graph 100 of FIG. 7 illustrates that there is a range of spot-diameter values for which high resolution estimation of the incidence angle of the SAL light can be achieved. For the exemplary results shown, the acceptable range of spot sizes can vary between being so small that the spot diameter is just larger than twice the width of an array element to being more than ½ the overall array size. A larger range of acceptable spot diameters and offset distances may be used when the incident light is stronger (and the signal photocurrent of an illuminated detector element 62 is higher). However, when the signal photocurrent is reduced, the allowable spot diameter becomes smaller. For a dual-mode seeker design with an F/1 lens, the detector capacitance becomes smaller and the noise lower as the spot diameter is reduced, assuming the array has a fixed number of elements 62. This results because the smaller spot 82 is achieved by moving the ISLD 26 closer to the lens 80 and changes in the offset distance also reduces the overall size of the array and thus the size of an array element 62 (when the FOV is fixed). Also, as the spot size is reduced, the incident light is divided among fewer detector elements 62 of the array, and thus the signal photocurrent of each illuminated detector element 62 is higher. Accordingly, the simulated results in the graph 100 show the results at different energy levels, which have corresponding different levels of photo-detected current.

Figure 8:
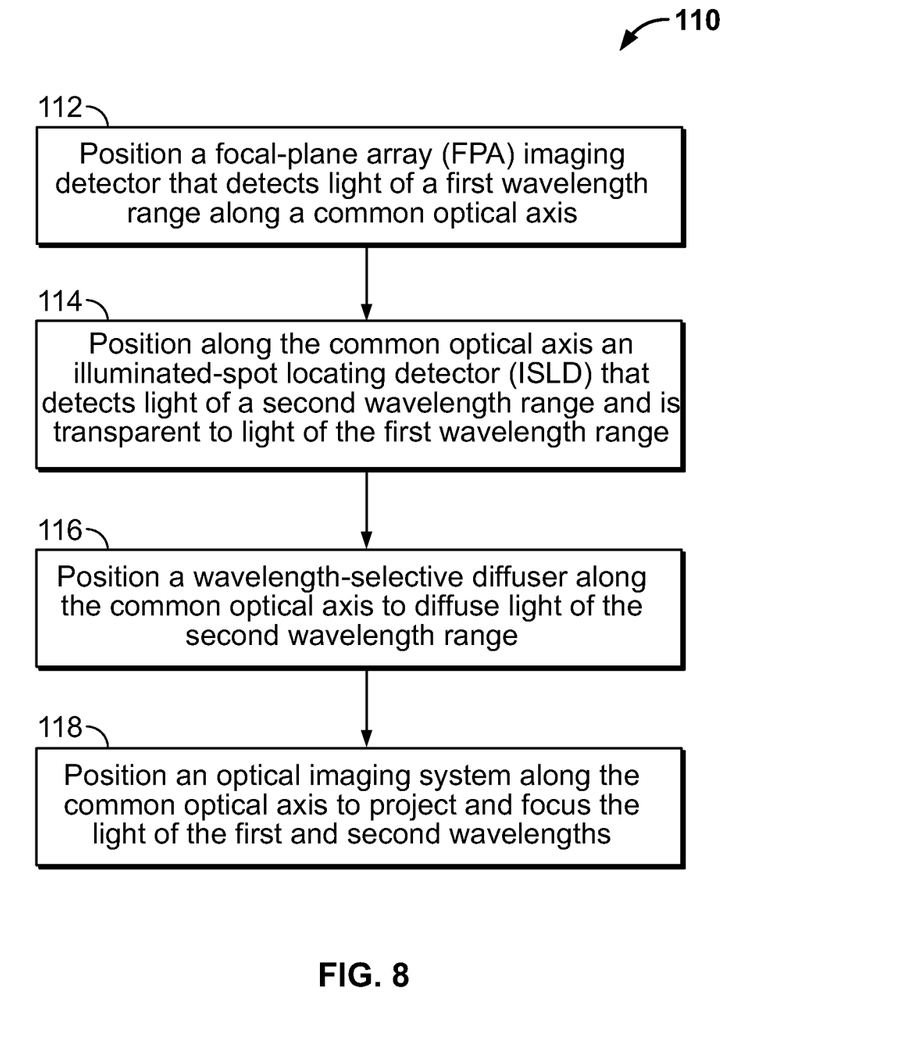
FIG. 8 is an illustration of operations performed by one embodiment to provide a dual-mode optical sensor.

Methods for providing a dual-mode optical sensor, such as the dual-mode optical sensor 20 may be provided, such as is illustrated in the method 110 of FIG. 8. The methods, for example, may employ structures or aspects of various embodiments (e.g., systems and/or methods) discussed herein. In various embodiments, certain steps may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion. In various embodiments, portions, aspects, and/or variations of the methods may be able to be used as one or more algorithms to direct hardware to perform operations described herein.

For example, the method 110 provides an optical sensor having an in-line optical configuration. The method 110 includes positioning at 112 a focal-plane array (FPA) imaging detector (e.g., the FPA imaging detector 28) that detects light of a first wavelength range along a common optical axis. In some embodiments, as described herein, the FPA imaging detector is the last detecting component along the common optical axis.

The method 110 also includes at 114 positioning along the common optical axis an ISLD (e.g., the ISLD 26) that is capable of detecting light of an entire second wavelength range, with the ISLD having high transparency to light of the first wavelength range, such a complete or substantially complete transparency. The level of transparency may vary in different embodiments. The ISLD may be formed from an array of light-detecting elements (e.g., an array of at least 16 light-detecting elements). In some embodiments, the ISLD is positioned adjacent and a distance from the FPA imaging detector, such as in front of the FPA imaging detector as described herein.

The method 110 also includes at 116 positioning along the common optical axis a wavelength-selective optical diffuser (e.g., the wavelength-selective optical diffuser 22) that diffuses or spreads laser light of the second wavelength range and that minimally (e.g., 5% or less) diffuses or spreads the light of the first wavelength range, such as wherein the shortest wavelength of the first range is at least 5 times larger than the longest wavelength of the second range in some embodiments. In various embodiments, the wavelength-selective optical diffuser is positioned in front of (along the common optical axis) the FPA imaging detector and ISLD and adjacent to and spaced apart from an optical aperture as described herein.

The method 110 also includes at 118 positioning along the common optical axis an optical imaging system (e.g., the optical imaging system 34), which may be a lens and that projects and focuses the light of the first and second wavelengths as described herein (and which may be projected and focused in combination with other components). For example, the optical imaging system may include one or more lenses that project and focus the light of the first wavelength range onto the imager and that, in combination with the wavelength-selective optical diffuser, projects onto the ISLD an illuminated spot of homogenized intensity that simultaneously overlaps more than four light-detecting elements of the ISLD.

It should be noted that various embodiments provided components in relative locations such that in some embodiments an optical sensor is formed that has an in-line optical configuration in which the light to be detected by the imaging detector first passes through the ISLD, and wherein the FPA imaging detector, the ISLD and the wavelength-selective diffuser share the common optical axis. However, different relative positioning of the components may be provided as desired or needed.

In operation, for example in one embodiment, the ISLD, the optical imaging system and the wavelength selective diffuser may be configured to project onto the ISLD a spot of light of the second wavelength range, wherein the size of the spot is greater than or equal to twice the width of a light-detecting element of the ISLD and is smaller than 0.75 times the size of the overall light-detecting area of the ISLD.

Additionally, in some embodiments, each light-detecting element of the ISLD is coupled to an associated electronic interface circuit. The multiple interface circuits associated with the multiple light-detecting elements are then coupled to the ISCD circuit configured to determine the angle of incidence of the light of the second wavelength range relative to the common optical axis of the ISLD, the imaging detector, the optical diffuser and the optical imaging system. Both the interface circuits and the ISCD circuit are located beyond the periphery of the area occupied by the light-detecting elements of the ISLD as described herein.

The optical sensor is some embodiments further comprises an interconnect base that has an opening formed in its central portion. The ISLD is mounted upon the interconnect base and over the central portion of that base. The electronic interface circuits and the ISCD circuit are mounted upon the interconnect base and away from the central portion of that base. The light to be detected by the imager is projected by the optical imaging system to pass through the ISLD, through the opening formed in the central portion of the interconnect base, and onto the imager, for example, the FPA imaging detector. The light-detecting elements of the ISLD are formed on a common substrate in various embodiments. Each light detecting element in some embodiments also contains an absorber region comprising a direct-bandgap semiconductor material that absorbs the light of the second wavelength range, but that has reduced or minimal absorption of the light of the first wavelength range. The substrate has reduced or minimal absorption of the light of both the first wavelength range and the second wavelength range. It should be noted that in some embodiments the thickness of the absorber regions is smaller than 10 times the maximum wavelength of the second wavelength range and can be smaller than 2 times the maximum wavelength of the second wavelength range in other embodiments.

It also should be noted that the particular arrangement of components (e.g., the number, types, placement, or the like) of the illustrated embodiments may be modified in various alternate embodiments. In various embodiments, different numbers of a given module or unit may be employed, a different type or types of a given module or unit may be employed, a number of modules or units (or aspects thereof) may be combined, a given module or unit may be divided into plural modules (or sub-modules) or units (or sub-units), a given module or unit may be added, or a given module or unit may be omitted.

It should be noted that the various embodiments of the circuits associated with the SAL detector and the circuits associated with the IIR detector may be implemented in hardware, software or a combination thereof. The various embodiments and/or components, for example, the modules, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a solid state drive, optical drive, and the like. The storage device may also be other similar means for loading computer programs or other instructions into the computer or processor.

As used herein, the term "computer," "controller," and "module" may each include any processor-based or microprocessor-based system including systems using microcontrollers, reduced instruction set computers (RISC), application specific integrated circuits (ASICs), logic circuits, GPUs, FPGAs, and any other circuit or processor capable of executing the functions described herein. The above examples are exemplary only, and are thus not intended to limit in any way the definition and/or meaning of the term "module" or "computer."

The computer, module, or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer, module, or processor as a processing machine to perform specific operations such as the methods and processes of the various embodiments described and/or illustrated herein. The set of instructions may be in the form of a software program. The software may be in various forms such as system software or application software and which may be embodied as a tangible and non-transitory computer readable medium. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program. The individual components of the various embodiments may be virtualized and hosted by a cloud type computational environment, for example to allow for dynamic allocation of computational power, without requiring the user concerning the location, configuration, and/or specific hardware of the computer system It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the invention without departing from their scope. While the dimensions and types of materials described herein are intended to define the parameters of the various embodiments of the invention, the embodiments are by no means limiting and are exemplary embodiments. Many other embodiments will be apparent to those of skill in the art upon reviewing the above description. The scope of the various embodiments of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the various embodiments of the invention, and also to enable any person skilled in the art to practice the various embodiments of the invention, including making and using any devices or systems and performing any incorporated methods. The patentable scope of the various embodiments of the invention is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. An optical sensor comprising:
    a focal-plane array (FPA) imaging detector configured to detect light of a first wavelength range;
    an illuminated-spot locating detector (ISLD) including an array of light-detecting elements configured to detect light of a second wavelength range, wherein the ISLD has a transparency to light of the first wavelength range;
    a wavelength-selective optical diffuser configured to diffuse light of the second wavelength range, wherein the shortest wavelength of the first range is larger than the longest wavelength of the second range, the ISLD is positioned such that the light to be detected by the FPA imaging detector first passes through the ISLD, and the FPA imaging detector, the ISLD and the wavelength-selective diffuser share a common optical axis; and
    a plurality of electronic interface circuits coupled to the ISLD, wherein the electronic interface circuits are associated with the light-detecting elements and coupled to an illuminated-spot centroid determination (ISCD) circuit, the ISCD circuit being configured to determine an angle of incidence of the light of the second wavelength range relative to the common optical axis of the ISLD, the imaging detector, the optical diffuser and the optical imaging system, wherein the electronic interface circuits and the ISCD circuit are located beyond a periphery of an area occupied by the light-detecting elements of the ISLD.

2. The optical sensor of claim 1, wherein the shortest wavelength of the first range is at least five times larger than the longest wavelength of the second range.

3. The optical sensor of claim 1, wherein the ISLD comprises at least 16 light-detecting elements.

4. The optical sensor of claim 1, further comprising an optical imaging system including at least one lens and sharing the common axis, the optical imaging system configured to project and focus the light of the first wavelength range onto the FPA imaging detector and that, in combination with the wavelength-selective optical diffuser, projects onto the ISLD an illuminated spot of homogenized intensity light that simultaneously overlaps more than four light-detecting elements of the ISLD.

5. The optical sensor of claim 4, wherein the ISLD, the optical imaging system and the wavelength selective diffuser are configured to project onto the ISLD a spot of light of the second wavelength range, wherein the size of the spot is greater than or equal to about twice the width of a light-detecting element of the ISLD and is smaller than about 0.75 times the size of an overall light-detecting area of the ISLD.

6. The optical sensor of claim 1, further comprising an interconnect base having an opening formed therein in a central portion, wherein the ISLD is coupled to the interconnect base and over the central portion, the electronic interface circuits and the ISCD coupled to the interconnect base a distance from and not overlapping the central portion such that the light to be detected by the FPA imaging detector is projected by the optical imaging system to pass through the ISLD, through the opening formed in the central portion of the interconnect base, and onto the FPA imaging detector.

7. The optical sensor of claim 1, further comprising metal traces connecting to the electronic interface circuits, the metal traces concentrated at a periphery of the ISLD.

8. The optical sensor of claim 1, wherein the light-detecting elements of the ISLD are formed on a common substrate and each light detecting element contains an absorber region comprising a direct-bandgap semiconductor material that absorbs the light of the second wavelength range and has a transparency to the light of the first wavelength range, the substrate having transparency to the light of the first wavelength range.

9. The optical sensor of claim 8, wherein a thickness of the absorber regions is smaller than ten times a maximum wavelength of the second wavelength range.

10. The optical sensor of claim 8, wherein the absorber regions comprises one of InGaAs or HgCdTe.

11. The optical sensor of claim 8, wherein the common substrate comprises one of InP or GaAs or CdTe.

12. The optical sensor of claim 1, wherein light comprises laser light and the FPA imaging detector is configured to detect laser light having a wavelength of between about 1.0 µm and about 1.65 µm.

13. A dual-mode optical sensor comprising:
   a focal-plane array (FPA) imaging detector configured to detect light of a first wavelength range;
   an illuminated-spot locating detector (ISLD) including an array of light-detecting elements configured to detect light of a second wavelength range, wherein the ISLD has a transparency to light of the first wavelength range having an absorption of the first wavelength of light of less than about 20%;
   a wavelength-selective optical diffuser configured to diffuse light of the second wavelength range and diffuse light of the first wavelength range at less than about 10% from a projected path, wherein the shortest wavelength of the first range is at least five times larger than the longest wavelength of the second range, the ISLD is positioned such that the light to be detected by the FPA imaging detector first passes through the ISLD, and the FPA imaging detector, the ISLD and the wavelength-selective diffuser share a common optical axis; and
   a plurality of electronic interface circuits coupled to the ISLD, wherein the electronic interface circuits are associated with the light-detecting elements and coupled to an illuminated-spot centroid determination (ISCD) circuit, the ISCD configured to determine an angle of incidence of the light of the second wavelength range relative to the common optical axis of the ISLD, the imaging detector, the optical diffuser and the optical imaging system, wherein the electronic interface circuits and the ISCD circuit are located beyond a periphery of an area occupied by the light-detecting elements of the ISLD.

14. The dual-mode optical sensor of claim 13, wherein the ISLD comprises at least 16 light-detecting elements and further comprising an optical imaging system including at least one lens and sharing the common axis, the optical imaging system configured to project and focus the light of the first wavelength range onto the FPA imaging detector and that, in combination with the wavelength-selective optical diffuser, projects onto the ISLD an illuminated spot of homogenized intensity light that simultaneously overlaps more than four light-detecting elements of the ISLD.

15. The dual-mode optical sensor of claim 14, wherein the ISLD, the optical imaging system and the wavelength selective diffuser are configured to project onto the ISLD a spot of light of the second wavelength range, wherein the size of the spot is greater than or equal to about twice the width of a light-detecting element of the ISLD and is smaller than about 0.75 times the size of the overall light-detecting area of the ISLD.

16. The dual-mode optical sensor of claim 13, wherein the light-detecting elements of the ISLD are formed on a common substrate and each light detecting element contains an absorber region comprising a direct-bandgap semiconductor material that absorbs the light of the second wavelength range and has a transparency to the light of the first wavelength range, the substrate having transparency to the light of the first wavelength range and the light of the second wavelength range, and further wherein light comprises laser light and the FPA imaging detector is configured to detect laser light having a wavelength of between about 1.0 µm and about 1.65 µm.

17. The dual-mode optical sensor of claim 16, wherein the absorber regions comprises one of InGaAs or HgCdTe, the common substrate comprising one of InP or GaAs or CdTe.

18. A method for providing an optical sensor, the method comprising:
   positioning along an optical axis a focal-plane array (FPA) imaging detector configured to detect light of a first wavelength range;
   positioning inline along the optical axis an illuminated-spot locating detector (ISLD) including an array of light-detecting elements configured to detect light of a second wavelength range, wherein the ISLD has a transparency to light of the first wavelength range;
   coupling a plurality of electronic interface circuits to the ISLD, wherein the electronic interface circuits are associated with the light-detecting elements;
   coupling the electronic interface circuits to an illuminated-spot centroid determination (ISCD) circuit, wherein the electronic interface circuits and the ISCD circuit are located beyond a periphery of an area occupied by the light-detecting elements of the ISLD; and
   positioning inline along the optical axis a wavelength-selective optical diffuser configured to diffuse light of the second wavelength range, wherein the shortest wavelength of the first range is larger than the longest wavelength of the second range, the ISLD is positioned such that the light to be detected by the FPA imaging detector first passes through the ISLD, and the FPA imaging detector, the ISLD and the wavelength-selective diffuser share a common optical axis.

* * * * *